US010798159B2

(12) United States Patent
Eggert et al.

(10) Patent No.: US 10,798,159 B2
(45) Date of Patent: Oct. 6, 2020

(54) METHODS FOR MANAGING WORKLOAD THROUGHPUT IN A STORAGE SYSTEM AND DEVICES THEREOF

(71) Applicant: NetApp, Inc., Sunnyvale, CA (US)

(72) Inventors: Lars Eggert, Munich (DE); Douglas Santry, Kent (GB)

(73) Assignee: NetApp, Inc., Sunnyvale, CA (US)

( * ) Notice: Subject to any disclaimer, the term of this patent is extended or adjusted under 35 U.S.C. 154(b) by 88 days.

(21) Appl. No.: 15/659,930

(22) Filed: Jul. 26, 2017

(65) Prior Publication Data
US 2019/0037013 A1 Jan. 31, 2019

(51) Int. Cl.
H04L 29/08 (2006.01)
H04L 29/06 (2006.01)
H04L 29/14 (2006.01)
G06F 3/06 (2006.01)

(52) U.S. Cl.
CPC ............ H04L 67/1023 (2013.01); G06F 3/06 (2013.01); H04L 67/1097 (2013.01); H04L 67/147 (2013.01); H04L 67/28 (2013.01); H04L 67/2804 (2013.01); H04L 69/22 (2013.01); H04L 69/40 (2013.01)

(58) Field of Classification Search
CPC ............ H04L 67/1023; H04L 67/1097; H04L 67/147; H04L 67/2804; H04L 67/28; H04L 69/22; H04L 69/40; G06F 3/06
See application file for complete search history.

(56) References Cited

U.S. PATENT DOCUMENTS

| | | | | |
|---|---|---|---|---|
| 6,157,955 A * | 12/2000 | Narad | ..................... | H04L 45/16 709/228 |
| 6,549,516 B1 * | 4/2003 | Albert | ................. | H04L 67/1002 370/236 |
| 6,856,991 B1 * | 2/2005 | Srivastava | ........ | H04L 29/12066 |
| 7,519,062 B1 * | 4/2009 | Kloth | ..................... | H04L 49/602 370/392 |
| 7,584,262 B1 * | 9/2009 | Wang | .................. | H04L 12/4625 709/217 |
| 7,711,819 B2 * | 5/2010 | Ono | ..................... | H04L 67/1008 709/226 |
| 7,877,490 B1 * | 1/2011 | Talagala | ................. | H04L 69/163 709/227 |
| 9,461,881 B2 * | 10/2016 | Kumarasamy | ...... | H04L 41/0846 |
| 2002/0078174 A1 * | 6/2002 | Sim | ........................ | H04L 47/125 709/219 |

(Continued)

Primary Examiner — Alina A Boutah
(74) Attorney, Agent, or Firm — Troutman Pepper Hamilton Sanders LLP (Rochester)

(57) ABSTRACT

Methods, non-transitory computer readable media, and computing devices that managing network traffic in a storage system include parse one or more packets received from a client to identify header data, and wherein the parsing comprises identifying when the one or more packets is a read request or a write request. A server is identified based on the parsed one or more packets. One or more rules are modified in the parsed one or more packets to allow data exchange between the client and the identified server. The parsed one or more packets are transmitted with the modified one or more rules to the identified server, wherein data exchange is initiated between the client and the identified server based on the parsed one or more packets with the modified one or more rules.

20 Claims, 4 Drawing Sheets

(56) References Cited

U.S. PATENT DOCUMENTS

| | | | | |
|---|---|---|---|---|
| 2002/0143955 A1* | 10/2002 | Shimada | H04L 29/06 | 709/227 |
| 2003/0046394 A1* | 3/2003 | Goddard | H04L 29/06 | 709/226 |
| 2003/0108052 A1* | 6/2003 | Inoue | H04L 29/12377 | 370/399 |
| 2003/0149755 A1* | 8/2003 | Sadot | H04L 29/06 | 709/223 |
| 2004/0093425 A1* | 5/2004 | Thomas | H04L 69/16 | 709/236 |
| 2005/0005006 A1* | 1/2005 | Chauffour | H04L 67/1027 | 709/223 |
| 2005/0055435 A1* | 3/2005 | Gbadegesin | H04L 29/06 | 709/224 |
| 2006/0050722 A1* | 3/2006 | Bury | H04L 49/90 | 370/403 |
| 2007/0192593 A1* | 8/2007 | Boisjolie | H04L 29/12367 | 713/162 |
| 2008/0013534 A1* | 1/2008 | Tsuzuki | H04L 45/00 | 370/389 |
| 2009/0161680 A1* | 6/2009 | Ishikawa | H04L 69/16 | 370/400 |
| 2010/0287227 A1* | 11/2010 | Goel | H04L 67/1002 | 709/202 |
| 2010/0312902 A1* | 12/2010 | Chaturvedi | H04M 7/0063 | 709/228 |
| 2013/0080575 A1* | 3/2013 | Prince | H04L 45/741 | 709/217 |
| 2013/0287031 A1* | 10/2013 | Ge | H04L 67/2804 | 370/389 |
| 2013/0332584 A1* | 12/2013 | Sun | H04L 61/251 | 709/219 |
| 2015/0180963 A1* | 6/2015 | Luecke | H04L 67/06 | 709/203 |
| 2016/0277355 A1* | 9/2016 | Shetty | H04L 12/4633 | |
| 2016/0285648 A1* | 9/2016 | Fan | H04L 12/6418 | |
| 2018/0241809 A1* | 8/2018 | Gandhi | H04L 67/1008 | |
| 2019/0004701 A1* | 1/2019 | Guim Bernat | G06F 3/061 | |
| 2020/0112514 A1* | 4/2020 | Fraser | H04L 47/27 | |

\* cited by examiner

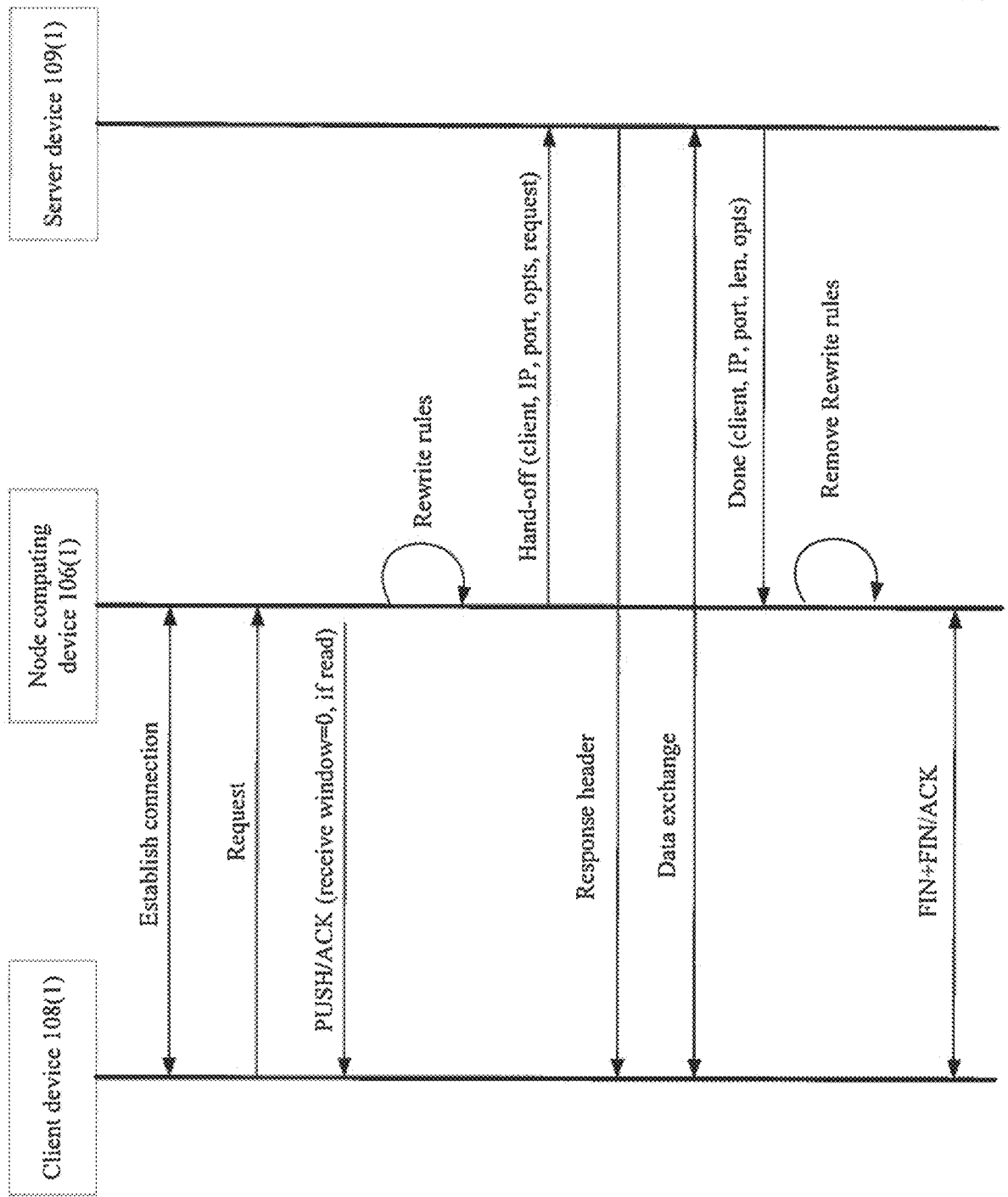

METHODS FOR MANAGING WORKLOAD THROUGHPUT IN A STORAGE SYSTEM AND DEVICES THEREOF

FIELD

This technology relates to managing workload throughput in a storage system for storage devices.

BACKGROUND

Many application's protocols communicate point-to-point over a single TCP connection, i.e., a client executes a potentially lengthy series of transactions with a server over a TCP connection. As demand grows, due to the point-to-point nature of the protocol the typical solution is the scale up the server by giving it more resources, instead of scaling out by spreading the client load to multiple back-end servers.

Unfortunately, the scale-out solutions require protocols where the client is aware of the scaled-out nature of the back-end servers, or they require complicated hand-off procedures, where the back-end servers coordinate migration of client connections. These traditional techniques of scale-out result in low throughput of packets which in turn provides sub-standard experience to the client devices.

BRIEF DESCRIPTION OF THE DRAWINGS

FIG. 4 is a sequence diagram of an exemplary method for managing network traffic in a storage system.

DETAILED DESCRIPTION

Figure 1:
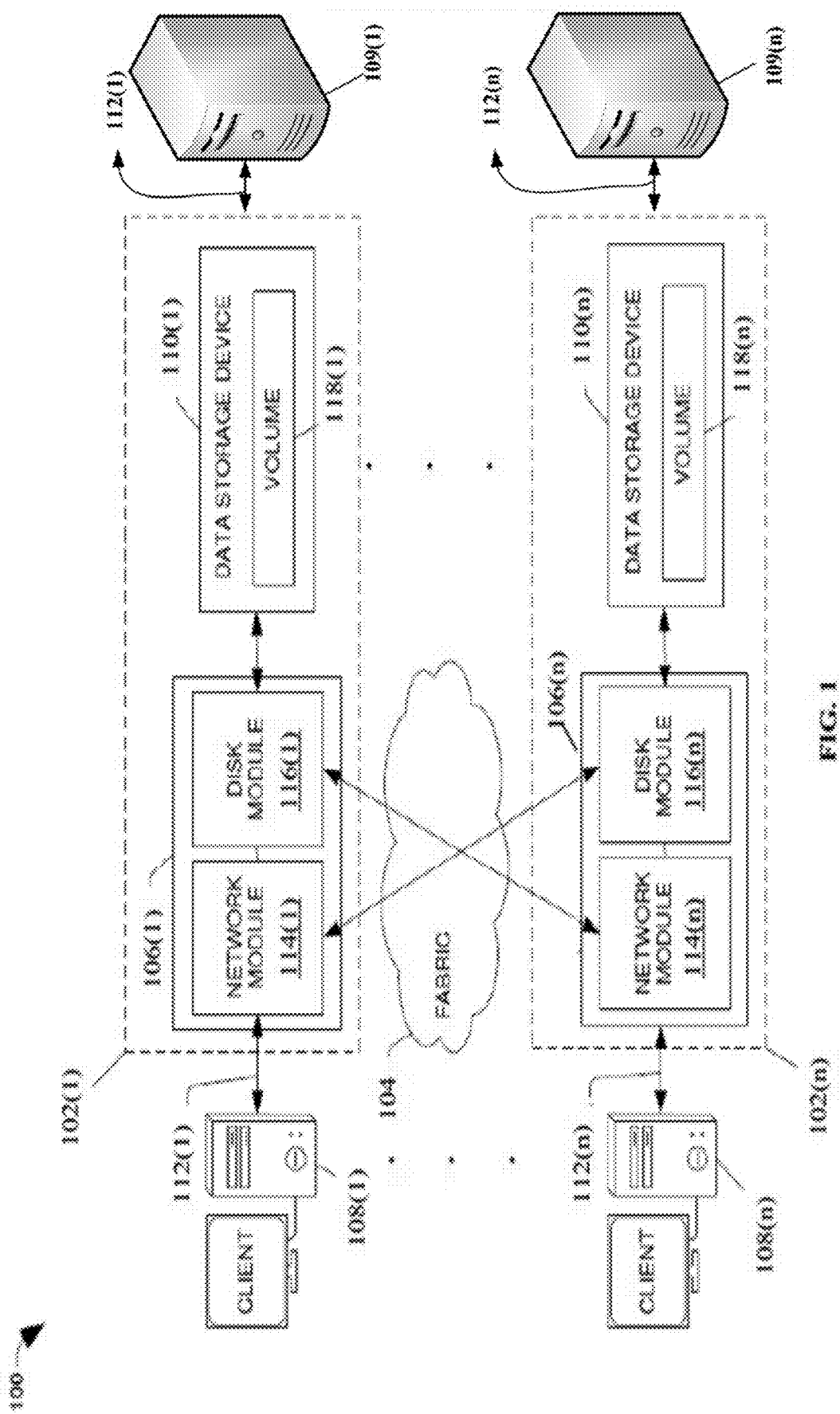
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that allow managing network traffic in a storage system.

In this example, node computing devices 106(1)-106(n) can be primary or local storage controllers or secondary or remote storage controllers that provide client devices 108(1)-108(n), with access to data stored within data storage devices 110(1)-110(n) or the server devices 109(1)-109(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The server devices 109(1)-109(n) include a central processing unit (CPU) or processor, a memory, and a communication system, which are coupled together by a bus or other link, although other numbers and/or types of network devices could be used. Generally, the server devices 109(1)-109(n) process requests for providing requested web pages or websites received from the client devices 108(1)-108(n), via the storage network connections 112(1)-112(n) according to the HTTP-based application RFC protocol or the CIFS or NFS protocol in this example, but the principles discussed herein are not limited to this example and can include other application protocols. A series of applications may run on the server devices 109(1)-109(n) include that allows the transmission of applications requested by the client devices 108(1)-108(n), or the node computing devices 106(1)-106(n). The server devices 109(1)-109(n) may provide data or receive data in response to requests directed toward the respective applications on the server devices 109(1)-109(n) from the client devices 108(1)-108(n) or the node computing devices 106(1)-106(n). It is to be understood that the server devices 109(1)-109(n) may be hardware or software or may represent a system with multiple external resource servers, which may include internal or external networks.

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) and server devices 109(1)-109(n) can be networked with the node computing devices 106(1)-106(n) in the cluster, over the storage connections 112(1)-112(n). As an example, respective client devices 108(1)-108(n) and the server devices 109(1)-109(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
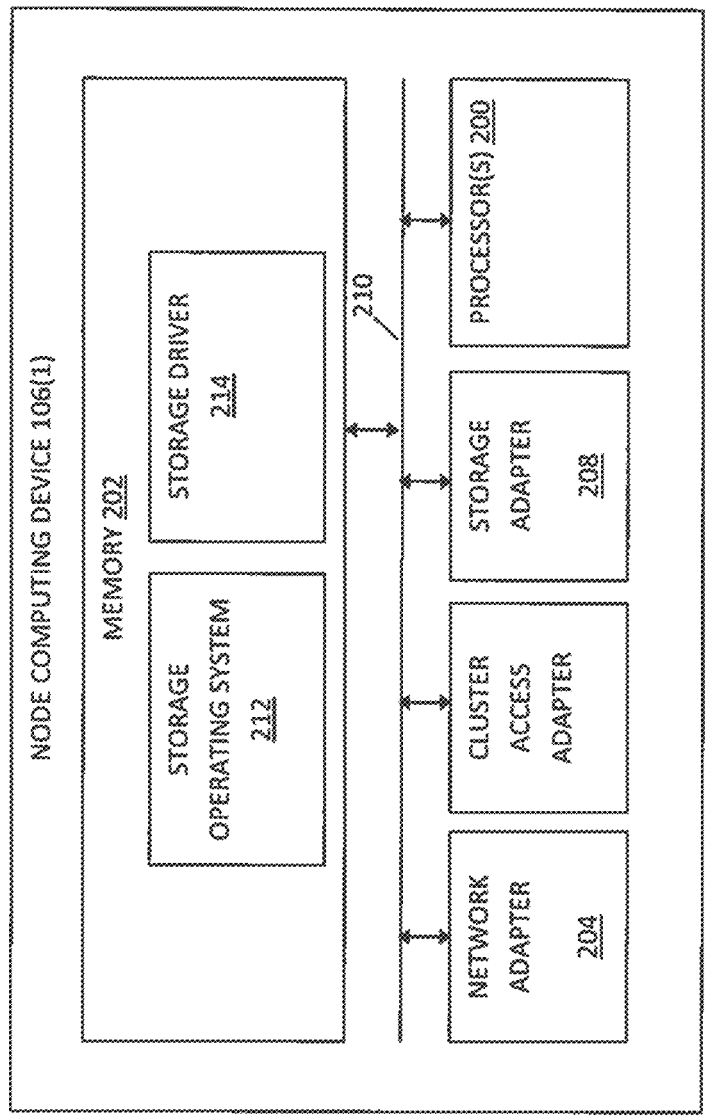
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-4, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 4.

Figure 3:
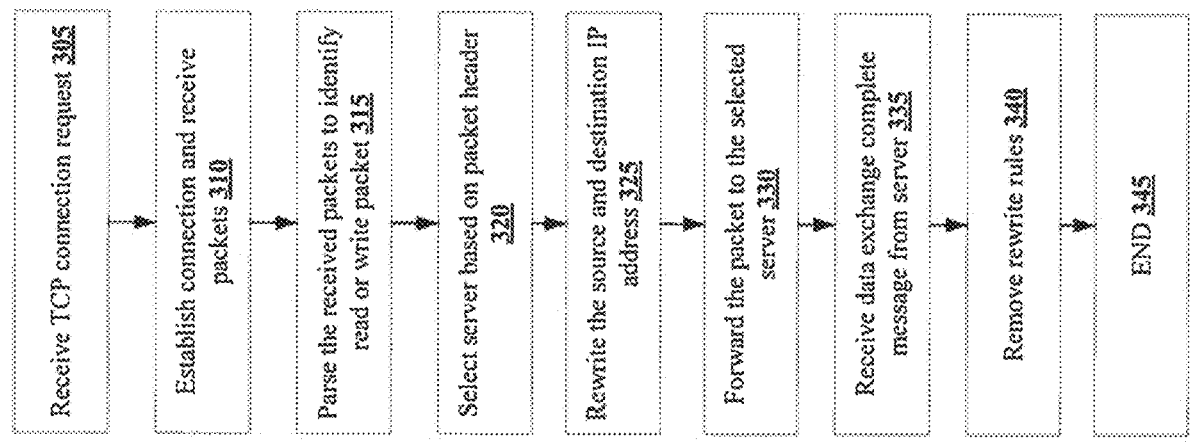
FIG. 3 is a flowchart of an exemplary method for managing network traffic in a storage system.

Referring to FIGS. 3 and 4, an exemplary method for managing network traffic in a storage system. In step 305 in this example, the node computing device 106(1) receives a TCP connection request from one of the client devices 108(1)-108(n), although the node computing device 106(1) can receive other types of requests from other devices. As would be appreciated by a person having ordinary skill in the art, the node computing device 106(1) and the requesting client device of the client devices 108(1)-108(n) may in this example perform a three-way handshake, negotiating the desired TCP options.

In step 310, the node computing device 106(1) establishes a connection with the requesting client device of the client devices 108(1)-108(n) and starts receiving the requests in form of network packets from the client device.

Next in step 315, the node computing device 106(1) parses the received packets from the requesting client devices 108(1)-108(n). In this example, the node computing device 106(1) parses the received packet to check whether the header information is complete in the packet and the type of the request (read or write), although the node computing device 106(1) can parse the packet for other types of data. Additionally, in this example, the node computing device 106(1) sends PUSH/ACK back to the requesting client device 108(1)-108(n) to set the TCP receive window to zero if the received request is a read request. By doing this, the node computing device 106(1) prevents the client from issuing additional requests.

In step 320, the node computing device 106(1) selects one of the servers 109(1)-109(n) based on the header information in the received packet, although the node computing device 106(1) can select the server based on other types or numbers of parameters.

Next in step 325, the node computing device 106(1) rewrites the destination internet protocol (IP) address of the received packets to that of the selected server and rewrites the source IP address of the packet to a logical IP address. By rewriting the source and destination IP address, the node computing device 106(1) allows the packets to the directly exchanged between the selected server and the requesting client device.

Next in step 330, the node computing device 106(1) forwards the received packet to the selected server and the packets are directly exchanged between the requesting client and the selected server. In this example, when the client request is a write request, the server must only ACK the payload data of that request and not any additional data the client may have sent. However when the client request is a read request, the server sets the TCP receive window to zero to prevent the client from sending any further data. Additionally, the selected server ignores any TCP FIN the requesting client would send to prevent the client from closing the connection before the connection is handed back to the node computing device 106(1). Further in this example, the node computing device 106(1) can pass any state information associated with the requesting client device to the selected server so that the selected server can take over the connection established with the requesting client.

In step 335, the node computing device 106(1) receives a data exchange complete message from the selected server when the data exchange between the client and the server is complete. Additionally in this example, the node computing device 106(1) includes the data associated with the client connection such as TCP sequence, ACL numbers, timestamp options, although other types of data associated with the client connection can be included.

Next in step 340, the node computing device 106(1) removes the rewrite rules that were included in the header and sends an ACK packet back to the requesting client device 108(1)-108(n) indicating that receiving window is open for a subsequent request. As a response, if the client sends a new request, the exemplary method again resumes as step 315. However, when the node computing device 106(1) receives a FIN handshake from the requesting client 108(1)-108(n), the node computing device 106(1) terminates the connection and the exemplary method ends at step 345.

With this technology, transaction payload data is exchanged directly between clients and backend servers, which eliminates the proxy bottleneck. Additionally, the disclosed technology allows the proxy to handle only metadata thereby scaling much higher number of transaction rates when compared to the traditional proxies. Furthermore, the disclosed technology is more efficient than traditional proxy-based approaches, because it performs the necessary transformations to scale out the communication steam on the packet level, utilizing software-defined network switches and controllers to transform client network packets in the network.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:

modifying, by a computing device, one or more packets received via a Transmission Control Protocol (TCP) connection with a client to replace a destination internet protocol (IP) address with a server IP address of a selected server, and to replace a source IP address with a logical IP address;

sending, by the computing device, an acknowledgement message to the client that closes a TCP receive window associated with the TCP connection to prevent the client from sending any subsequent packets before the TCP connection is transferred to the selected server;

transmitting, by the computing device, state information associated with the TCP connection and the modified one or more packets to the selected server to facilitate an exchange of data between the selected server and the client; and terminating, by the computing device, the TCP connection upon receiving a TCP finish handshake message from the client.

2. The method as set forth in claim 1, wherein the state information comprises one or more of a TCP sequence number, access control list (ACL) information, or one or more timestamp options.

3. The method as set forth in claim 1, further comprising replacing, by the computing device, another source IP address and another destination IP address of one or more response packets upon receiving a data exchange completion message from the selected server.

4. The method as set forth in claim 1, further comprising selecting, by the computing device, the server based on a type of request associated with the one or more packets.

5. The method as set forth in claim 1, further comprising initiating, by the computing device, a data exchange between the client and the selected server based on the replaced source IP address and the replaced destination IP address.

6. The method as set forth in claim 1, further comprising sending, by the computing device, the acknowledgement message to the client when the one or more packets are determined to be associated with a read request.

7. A non-transitory machine readable medium having stored thereon instructions for managing workload throughput comprising machine executable code which when executed by at least one machine causes the machine to:
modify one or more packets received via a Transmission Control Protocol (TCP) connection with a client to replace a destination internet protocol (IP) address with a server IP address of a selected server, and to replace a source IP address with a logical IP address;
send an acknowledgement message to the client that closes a TCP receive window associated with the TCP connection to prevent the client from sending any subsequent packets before the TCP connection is transferred to the selected server;
transmit state information associated with the TCP connection and the modified one or more packets to the selected server to facilitate an exchange of data between the selected server and the client; and
terminate the TCP connection upon receiving a TCP finish handshake message from the client.

8. The medium as set forth in claim 7, wherein the state information comprises one or more of a TCP sequence number, access control list (ACL) information, or one or more timestamp options.

9. The medium as set forth in claim 7, wherein the machine executable code, when executed by the machine, further causes the machine to replace another source IP address and another destination IP address of one or more response packets upon receiving a data exchange completion message from the selected server.

10. The medium as set forth in claim 7, wherein the machine executable code, when executed by the machine, further causes the machine to select the server based on a type of request associated with the one or more packets.

11. The medium as set forth in claim 7, wherein the machine executable code, when executed by the machine, further causes the machine to initiate a data exchange between the client and the selected server based on the replaced source IP address and the replaced destination IP address.

12. The medium as set forth in claim 7, wherein the machine executable code, when executed by the machine, further causes the machine to send the acknowledgement message to the client when the one or more packets are determined to be associated with a read request.

13. A computing device, comprising:
a memory containing machine readable medium comprising machine executable code having stored thereon instructions for managing workload throughput; and
a processor coupled to the memory and configured to execute the machine executable code to cause the processor to:
modify one or more packets received via a Transmission Control Protocol (TCP) connection with a client to replace a destination internet protocol (IP) address with a server IP address of a selected server, and to replace a source IP address with a logical IP address;
send an acknowledgement message to the client that closes a TCP receive window associated with the TCP connection to prevent the client from sending any subsequent packets before the TCP connection is transferred to the selected server;
transmit state information associated with the TCP connection and the modified one or more packets to the selected server to facilitate an exchange of data between the selected server and the client; and
terminate the TCP connection upon receiving a TCP finish handshake message from the client.

14. The computing device as set forth in claim 13, wherein the state information comprises one or more of a TCP sequence number, access control list (ACL) information, or one or more timestamp options.

15. The computing device as set forth in claim 13, wherein the processor is further configured to execute the machine executable code to further cause the processor to replace another source IP address and another destination IP address of one or more response packets upon receiving a data exchange completion message from the selected server.

16. The computing device as set forth in claim 13, wherein the processor is further configured to execute the machine executable code to further cause the processor to select the server based on a type of request associated with the one or more packets.

17. The computing device as set forth in claim 13, wherein the processor is further configured to execute the machine executable code to further cause the processor to initiate a data exchange between the client and the selected server based on the replaced source IP address and the replaced destination IP address.

18. The computing device as set forth in claim 13, wherein the processor is further configured to execute the machine executable code to further cause the processor to send the acknowledgement message to the client when the one or more packets are determined to be associated with a read request.

19. The computing device as set forth in claim 13, wherein the processor is further configured to execute the machine executable code to further cause the processor to send another acknowledgement message to the client that opens the TCP receive window subsequent to receiving a data exchange complete message from the selected server.

20. The computing device as set forth in claim 13, wherein the processor is further configured to execute the machine executable code to further cause the processor to acknowledge payload data of the one or more packets to the client without closing the TCP receive window associated with the TCP connection, when the one or more packets are associated with a write request.

* * * * *